US011587299B2

(12) United States Patent
Khaloo

(10) Patent No.: US 11,587,299 B2
(45) Date of Patent: Feb. 21, 2023

(54) SYSTEMS AND METHODS FOR DETECTION OF ANOMALIES IN CIVIL INFRASTRUCTURE USING CONTEXT AWARE SEMANTIC COMPUTER VISION TECHNIQUES

(71) Applicant: The Joan and Irwin Jacobs Technion—Cornell Institute, New York, NY (US)

(72) Inventor: Ali Khaloo, New York, NY (US)

(73) Assignees: THE JOAN AND IRWIN JACOBS, New York, NY (US); TECHNION-CORNELL INSTITUTE, New York, NY (US)

(*) Notice: Subject to any disclaimer, the term of this patent is extended or adjusted under 35 U.S.C. 154(b) by 0 days.

(21) Appl. No.: 16/867,728

(22) Filed: May 6, 2020

(65) Prior Publication Data

US 2020/0357191 A1    Nov. 12, 2020

Related U.S. Application Data

(60) Provisional application No. 62/844,293, filed on May 7, 2019.

(51) Int. Cl.
G06T 19/20    (2011.01)
(52) U.S. Cl.
CPC .......... *G06T 19/20* (2013.01); *G06T 2210/56* (2013.01); *G06T 2219/004* (2013.01); *G06T 2219/2012* (2013.01)
(58) Field of Classification Search
None
See application file for complete search history.

(56) References Cited

U.S. PATENT DOCUMENTS 10,295,435 B1    5/2019    Wu et al.
2012/0218411 A1*  8/2012    Wu ........................ G01N 25/72
                                                          348/148

(Continued)

OTHER PUBLICATIONS

The International Search Report and The Written Opinion of the International Searching Authority for PCT/US2020/031569, dated Sep. 10, 2020, ISA/RU, Moscow, Russia.

*Primary Examiner* — Kee M Tung
*Assistant Examiner* — Jed-Justin Imperial
(74) *Attorney, Agent, or Firm* — M&B IP Analysts, LLC

(57) ABSTRACT

Techniques for context-aware identification of anomalies in civil infrastructure. A method includes applying an anomaly identification model to features extracted from visual content showing civil infrastructure in order to determine at least one anomalous portion shown in the visual multimedia content, a type of each anomalous portion, and a quantification of each anomalous portion; wherein the anomaly identification model is selected based on a type of material of the civil infrastructure; and generating a semantically labeled three-dimensional (3D) model based on the at least one anomalous portion and the type of each anomalous portion, wherein the semantically labeled 3D model includes anomalous points; wherein each anomalous point represents one of the at least one anomalous portion; wherein the anomalous points collectively define a pattern of the at least one anomalous portion; wherein each anomalous point is visually distinguished to indicate the quantification of the respective anomalous portion.

23 Claims, 13 Drawing Sheets

(56) References Cited

U.S. PATENT DOCUMENTS

| | | |
|---|---|---|
| 2014/0163931 A1 | 6/2014 | Snyder et al. |
| 2015/0371112 A1* | 12/2015 | Sun .......................... G06T 5/20 |
| | | 382/160 |
| 2016/0350907 A1* | 12/2016 | Simula .................. G01N 33/42 |
| 2017/0277761 A1 | 9/2017 | Bentley et al. |
| 2018/0012125 A1 | 1/2018 | Ladha et al. |
| 2018/0138996 A1* | 5/2018 | Lee ..................... H04B 17/345 |
| 2018/0170540 A1 | 6/2018 | Claybrough |
| 2018/0336652 A1 | 11/2018 | Wani et al. |
| 2019/0017911 A1 | 1/2019 | Kiranyaz et al. |
| 2019/0035165 A1 | 1/2019 | Gausebeck |
| 2019/0079958 A1 | 3/2019 | Bentley et al. |
| 2019/0096135 A1* | 3/2019 | Dal Mutto ................ G06T 7/50 |
| 2019/0271966 A1* | 9/2019 | Coffman .................. G06N 5/04 |

* cited by examiner

SYSTEMS AND METHODS FOR DETECTION OF ANOMALIES IN CIVIL INFRASTRUCTURE USING CONTEXT AWARE SEMANTIC COMPUTER VISION TECHNIQUES

CROSS-REFERENCE TO RELATED APPLICATIONS

This application claims the benefit of U.S. Provisional Patent Application No. 62/844,293 filed on May 7, 2019, the contents of which are hereby incorporated by reference.

TECHNICAL FIELD

The present disclosure relates generally to two-dimensional (2D) and three-dimensional (3D) visual multimedia content analysis for anomalies and other anomalies in civil infrastructure, and more particularly to identifying and analyzing anomalies shown in visual multimedia content of civil infrastructure.

BACKGROUND

Accurate and rapid assessment of the condition of in-service structural systems is critical for ensuring safety and serviceability. In particular, one major consideration in assessing the condition of civil infrastructure is visible signs of structural damages. These anomalies may include defects such as structural deficiencies due to deterioration and excessive usage (e.g., steel corrosion, cracks, concrete efflorescence, and concrete spalling), which may be due to or may be exacerbated by anomalies in design or manufacture. To this end, an area of interest for assessing infrastructure condition is the detection and quantification of such anomalies. For example, the spatial characteristics of cracks and spalling on concrete surfaces are significant indicators for evaluating the health of existing infrastructure.

Developments in the fields of remote sensing, robotics, and image capturing technologies provide an opportunity to collect large amounts of visual data such as images, videos, and three-dimensional (3D) imaging (also known as 3D point clouds or 3D meshes) related to civil infrastructure that may be used to evaluate the condition of such systems. However, such a large amount of data is not feasible to analyze and manipulate manually.

Some automated solutions exist. For example, some solutions utilize bounding boxes around potential anomalies identified in images. However, such automated solutions face challenges in the accuracy and granularity of anomaly identification. In addition, the existing methods typically use two-dimensional images that have a narrow field and are often high-resolution close-ups of the structure. These images are fundamentally decontextualized since they do not consider information in the context of the structure the way a human observer in the field intuitively does.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for context-aware identification of anomalies in civil infrastructure. The method comprises: applying an anomaly identification model to features extracted from visual multimedia content showing at least a portion of civil infrastructure in order to determine at least one anomalous portion shown in the visual multimedia content, a type of each anomalous portion, and a quantification of each anomalous portion; wherein the anomaly identification model is a machine learning model selected from among a plurality of anomaly identification models based on a type of material of the at least a portion of civil infrastructure; and generating a semantically labeled three-dimensional (3D) model based on the at least one anomalous portion and the type of each anomalous portion, wherein the semantically labeled 3D model includes a plurality of points; the plurality of points including a plurality of anomalous points; wherein each anomalous point represents a respective anomalous portion of the at least one anomalous portion; wherein the plurality of anomalous points collectively defines a pattern of each of the at least one anomalous portion; wherein each anomalous point is visually distinguished to at least indicate the quantification of the respective anomalous portion.

Certain embodiments disclosed herein also include a non-transitory computer readable medium having stored thereon causing a processing circuitry to execute a process, the process comprising: applying an anomaly identification model to features extracted from visual multimedia content showing at least a portion of civil infrastructure in order to determine at least one anomalous portion shown in the visual multimedia content, a type of each anomalous portion, and a quantification of each anomalous portion; wherein the anomaly identification model is a machine learning model selected from among a plurality of anomaly identification models based on a type of material of the at least a portion of civil infrastructure; and generating a semantically labeled three-dimensional (3D) model based on the at least one anomalous portion and the type of each anomalous portion, wherein the semantically labeled 3D model includes a plurality of points; the plurality of points including a plurality of anomalous points; wherein each anomalous point represents a respective anomalous portion of the at least one anomalous portion; wherein the plurality of anomalous points collectively defines a pattern of each of the at least one anomalous portion; wherein each anomalous point is visually distinguished to at least indicate the quantification of the respective anomalous portion.

Certain embodiments disclosed herein also include a system for context-aware identification of anomalies in civil infrastructure. The system comprises: a processing circuitry; and a memory, the memory containing instructions that, when executed by the processing circuitry, configure the system to: apply an anomaly identification model to features extracted from visual multimedia content showing at least a portion of civil infrastructure in order to determine at least one anomalous portion shown in the visual multimedia content, a type of each anomalous portion, and a quantification of each anomalous portion; wherein the anomaly identification model is a machine learning model selected from among a plurality of anomaly identification models based on a type of material of the at least a portion of civil infrastructure; and generate a semantically labeled three-dimensional (3D) model based on the at least one anomalous portion and the type of each anomalous portion, wherein the semantically labeled 3D model includes a plurality of points; the plurality of points including a plurality of anomalous points; wherein each anomalous point represents a respective anomalous portion of the at least one anomalous portion; wherein the plurality of anomalous points collectively defines a pattern of each of the at least one anomalous portion; wherein each anomalous point is visually distinguished to at least indicate the quantification of the respective anomalous portion.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1:
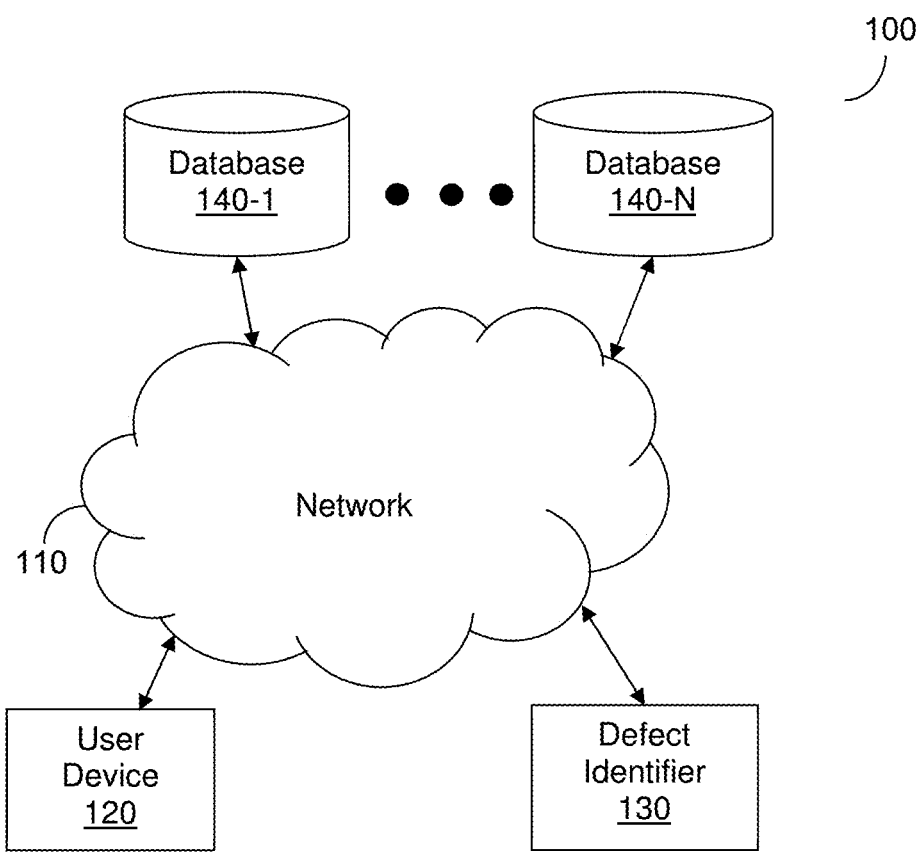
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include techniques for visual identification of anomalies such as defects in civil infrastructure using machine learning and computer vision as well as techniques for postprocessing of visual multimedia content based on such identified anomalies. Machine learning models including a material identification model and multiple per-material anomaly identification models are trained based on respective sets of training data. Each anomaly identification model is trained to identify anomalies shown in visual multimedia content of portions of infrastructure made of different materials.

When the machine learning models have been trained, visual multimedia content showing at least a portion of infrastructure is obtained. The visual multimedia content may include, but is not limited to, visual multimedia content (e.g., images, video, or portions thereof) or structural models (e.g., a 3D model of the at least a portion of the infrastructure). The at least a portion of infrastructure may be, but is not limited to, a building, road, bridge, dam, levee, water or sewage system, railway, subway, airport, harbor, electrical grids, telecommunications equipment, a portion thereof, and the like. Example portions of infrastructure include, but are not limited to, pipes, sections of road, beams, columns, girders, decks, ceilings, floors, roofs, vents, fans, tracks, poles, wires, channels, ramps, abutments, arches, other support structures, and the like.

The visual multimedia content may be preprocessed. The preprocessing may include, but is not limited to, removing visual multimedia content that is blurry, distorted, zoomed out, noisy, or otherwise likely to reduce the accuracy of anomaly identification. The preprocessing may alternatively or additionally include generating multiple 2D views, for example, when the visual content is a 3D model of the at least a portion of infrastructure.

The material identification machine learning model is applied to the visual multimedia content in order to identify a type of material shown in the visual multimedia content. Based on the identified material, one of the anomaly identification models is selected. The selected anomaly identification model is configured to identify anomalies in visual multimedia content for the identified type of material.

The selected anomaly identification and quality assessment models are applied to the visual multimedia content in order to identify one or more anomalies shown therein. The identified anomalies include damage or other visible signs of anomalies in infrastructure. More specifically, each anomaly is identified with respect to discrete portions of the visual multimedia content via multi-class semantic segmentation, a task of clustering parts of visual multimedia content together which belong to the same object class (also called pixel-level, point, and mesh-wise classification). Such discrete portions may include, but are not limited to, pixels in 2D images or points or meshes in 3D models. To this end, each discrete portion in the visual multimedia content may be identified as belonging to an anomaly or not and may be further identified with respect to specific anomalies. A pattern of the identified anomalies is extracted from the visual multimedia content based on the multi-class semantic segmentation using deep Convolutional Neural Networks (CNNs) designed to capture fine-grained details.

In an embodiment, the distinct portions of the visual multimedia content may be labeled based on the identification of anomalies. The labels may indicate, but are not limited to, whether each discrete portion belongs to a defect, which anomaly each discrete portion belongs to, both, and the like.

The identified anomalies may be quantified based on size of the extracted pattern (e.g., with respect to a number of discrete portions representing each defect) relative to the visual multimedia content. The quantification may be with respect to a length, width, volume, or other measurement of size of the defect. As a non-limiting example, an anomaly may be quantified with respect to a number or Euclidean distance of pixels (in a 2D image) or points in a 3D model (e.g., parametric surfaces, triangulated surface meshes, point clouds, etc.) identified as belonging to the defect. To this end, the labels of the discrete portions may be utilized for the quantification. In some implementations, the size of the anomaly may be converted to global units (e.g., millimeters) based on the size with respect to discrete portions and known global sizes of the visual multimedia content. As a non-limiting example, a known size of a column and a number of pixels showing the column may be utilized to determine a size of each pixel, which in turn can be utilized with a number of pixels belonging to a damaged portion of the column to determine a size of the damaged portion.

The extracted pattern may be projected in a visually distinct manner onto the visual multimedia content, a 3D three-dimensional virtual model of the infrastructure, or both. In particular, in an embodiment, such projection is utilized when the visual multimedia content includes a sufficient number of overlapping 2D images covering an object from different angles or when such a 3D model is available. In an embodiment, the extracted pattern is projected onto the visual multimedia content using projection or back projection, which includes identifying the corresponding features between 2D and 3D visual multimedia content and mapping the identified and labeled anomaly into the 3D model. Projecting the extracted pattern may include, but is not limited to, modifying pixels in the visual multimedia showing the identified anomalies or portions of the three-dimensional virtual model representing the portions of the infrastructure having the identified anomalies. The modification includes colorization or other changes that render the modified pixels or points that are visually distinct (e.g., to a human observer) from other portions of the visual multimedia content or three-dimensional virtual model. This provides a condition-aware and semantically rich digital twin of the civil infrastructure asset. The digital twin is a virtual representation of the object shown in the visual multimedia content or represented by the 3D model.

The disclosed embodiments include a fully automated two-stage machine learning process for identifying anomalies in portions of infrastructure. By first identifying a type of material and then selecting a model that is trained to identify anomalies in that specific material, the accuracy of the resulting anomaly identification is improved as well as the level of automation in comparison to, for example, some existing solutions that utilize manually determined material identifications in order to later draw bounding boxes around anomalies through machine learning techniques. The various disclosed embodiments further include techniques for postprocessing of the visual multimedia content in order to provide modified visual representations of infrastructure that highlight the identified anomalies.

Additionally, the disclosed embodiments provide improved granularity of anomaly identification by allowing for identification of more specific portions of visual multimedia content (e.g., particular pixels) representing anomalies as compared to, for example, bounding boxes or other identifications of areas in multimedia content that may include some portions representing anomalies and some portions that do not.

The various disclosed embodiments provide context-aware techniques for anomaly identification. The anomaly identification is context-aware at least in that (1) the types of anomalies identified are context-sensitive with respect to the type of material of the civil infrastructure being analyzed, and (2) the location, size, and pattern of the anomalies are reflected in context within the real-life civil infrastructure. In this regard, it is noted that different materials have different typical anomalies. Additionally, although some existing solutions provide bounding boxes on 2D images, these solutions do not truly capture the context of anomalies in a manner that captures the characteristics (e.g., length, width, volume, area, etc.) of the anomaly which allows for evaluation of severity of anomalies or location of those anomalies within the actual civil infrastructure.

FIG. 1 shows an example network diagram 100 utilized to describe the various disclosed embodiments. In the example network diagram 100, a user device 120, an anomaly identifier 130, and a plurality of databases 140-1 through 140-N (hereinafter referred to individually as a database 140 and collectively as databases 140, merely for simplicity purposes) are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving and displaying data including, for example, visual multimedia content, computer generated models, or both.

The databases 140 may store visual multimedia content (e.g., images), computer generated models, digital twins, or a combination thereof. The visual multimedia content stored by the databases 140 may include visual multimedia content showing infrastructure that is to be analyzed by the anomaly identifier 130, enhanced visual multimedia content showing visually distinguishing projections of anomaly patterns on infrastructure that are generated by the anomaly identifier 130, or both. The visual multimedia content to be analyzed stored in the databases 140 may include images, videos, three-dimensional models (e.g., parametric surfaces, point clouds, or three-dimensional meshes), or a combination thereof. The visual multimedia content may be captured by, for example, digital cameras, camcorders, smartphones, tablets, camera-mounted unmanned aerial vehicles (UAVs) such as drones, camera-mounted vehicles, laser scanners, robots (e.g., ground-based, crawling, or climbing robots), camera-mounted unmanned marine vehicles (UMVs), combinations thereof, and the like.

In this regard, it should be noted that anomaly patterns may be any visible pattern appearing on the surface of civil infrastructure. The patterns may encapsulate, but are not limited to, the sizes and shapes of anomalies. The sizes may include, but are not limited to, thickness, width, radius, and other measurements of size for different kinds of shapes. The patterns may reflect shapes of, for example but not limited to, corrosion, cracks, concrete efflorescence, spalling, and the like.

The three-dimensional virtual models may be modified models created by the anomaly identifier 130 including visually distinguishing projections of anomaly patterns on infrastructure, three-dimensional virtual models to be modified by the anomaly identifier 130, or both. In an example implementation, these three-dimensional virtual models are three-dimensional (3D) models of infrastructure shown in visual multimedia content. As a non-limiting example, one such 3D model may be a 3D model of a column that is shown in images of a building.

The projections are represented by the visual multimedia content and three-dimensional virtual models such that they are visually distinct from the infrastructure, for example, using visually distinct colors. As a non-limiting example, if the infrastructure is made of grey concrete, cracks in the concrete may be colored blue or green.

In an embodiment, the anomaly identifier 130 is configured to identify anomalies shown in visual multimedia content of infrastructure as described herein. The anomaly identifier 130 is configured to obtain the visual multimedia content showing the infrastructure or portions thereof, for example by retrieving such visual multimedia content from one of the databases 140. The visual multimedia content may include, but is not limited to, two-dimensional or three-dimensional images or video (or portions thereof) showing the infrastructure.

In an embodiment, the anomaly identifier 130 may be further configured to generate a report demonstrating the identified anomalies. To this end, the anomaly identifier 130 may be configured to project visual markers for the identified anomalies onto visual multimedia content or 3D models of the infrastructure, to quantify visual signs of anomalies, or both. The anomaly identifier 130 may be further configured to generate 3D models of the infrastructure based on the visual multimedia content showing the infrastructure.

The anomaly identifier 130 may be configured to send the generated report to the user device 120. The user device 120 may receive the report and display any visual multimedia content or three-dimensional virtual models included therein. The anomaly identification, as well as generation and sending of the report, may be performed in real-time or near real-time, for example as visual multimedia content is received. As a non-limiting example, anomalies may be identified and semantically segmented in 2D images using techniques such as Simultaneous Localization and Mapping (SLAM) or Visual SLAM to register results to a 3D model in real-time.

In various implementations, the anomaly identifier 130 may be deployed in a cloud computing platform (not shown). Non-limiting examples for such cloud computing platforms include Amazon® Web Services, Microsoft® Azure, IBM® cloud, and the like. To this end, the anomaly identifier 130 may be realized as, for example, hardware (e.g., a server), software (e.g., a program installed on a server used to host cloud computing services), or a combination thereof.

It should be noted that the network diagram 100 is utilized to describe various embodiments merely for example purposes and that the disclosed embodiments are not limited to the particular network environment shown in FIG. 1.

Figure 2:
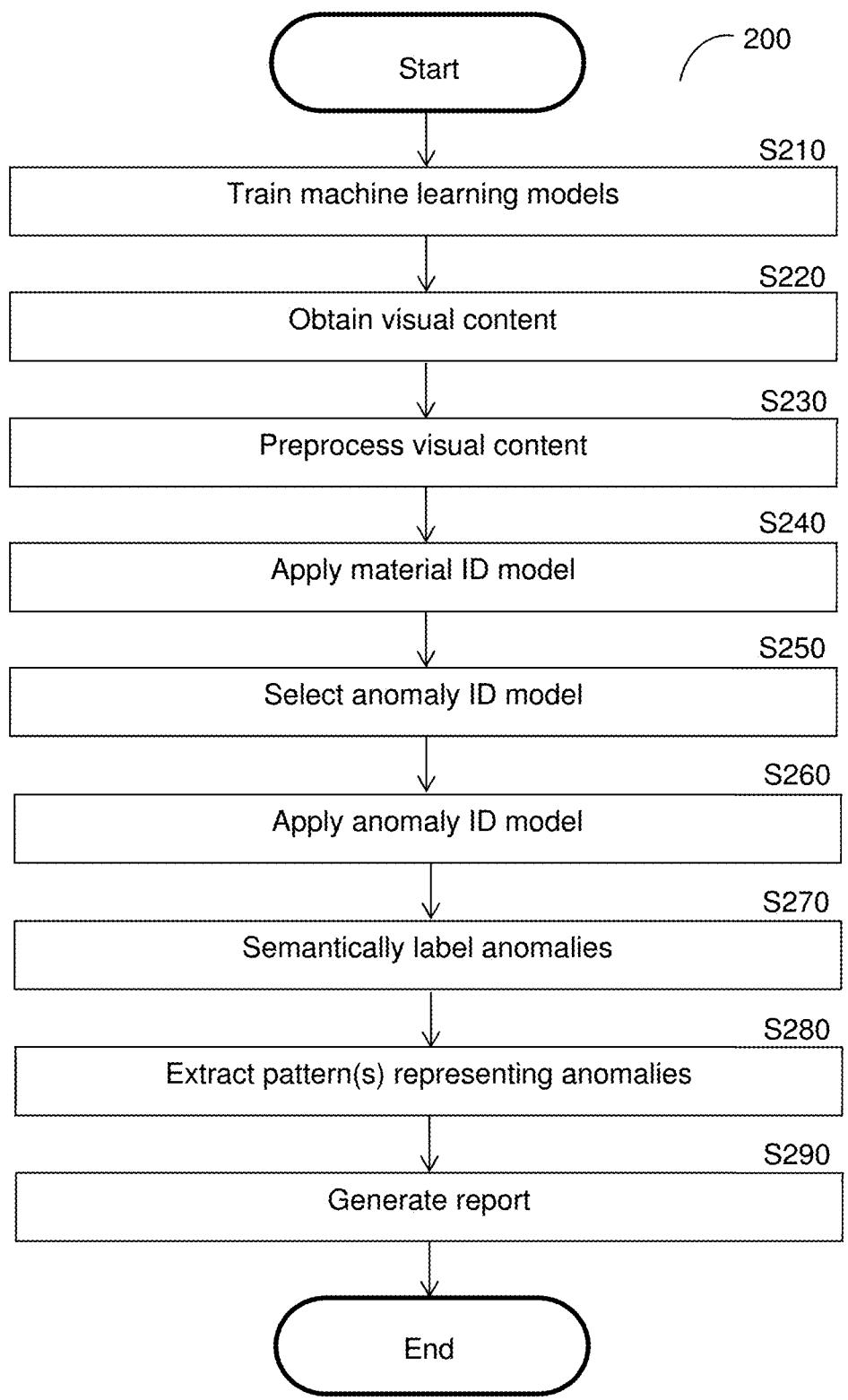
FIG. 2 is a flowchart illustrating a method for visual identification of anomalies in civil infrastructure using machine learning.

FIG. 2 is an example flowchart 200 illustrating a method for visual identification of anomalies in infrastructure using machine learning according to an embodiment. The method is performed with respect to visual multimedia content such as, but not limited to, images, videos, 3D models, or other content showing or representing portions of infrastructure. In an embodiment, the method is performed by the anomaly identifier 130, FIG. 1.

At S210, machine learning models to be used for identifying anomalies of infrastructure shown in images are trained. The trained models include a material identification (ID) model and multiple anomaly identification (ID) models. The material identification model is trained to identify a type of material that a portion of infrastructure is made of when applied to images showing the portion of infrastructure. Each anomaly identification model is trained to identify one or more anomalies in a portion of infrastructure made of a type of material (e.g., concrete, steel, etc.) when applied to images showing portions of infrastructure made of that type of material. Different anomaly identification models are therefore trained to identify anomalies in portions of infrastructure made from different types of materials.

Figure 3A:
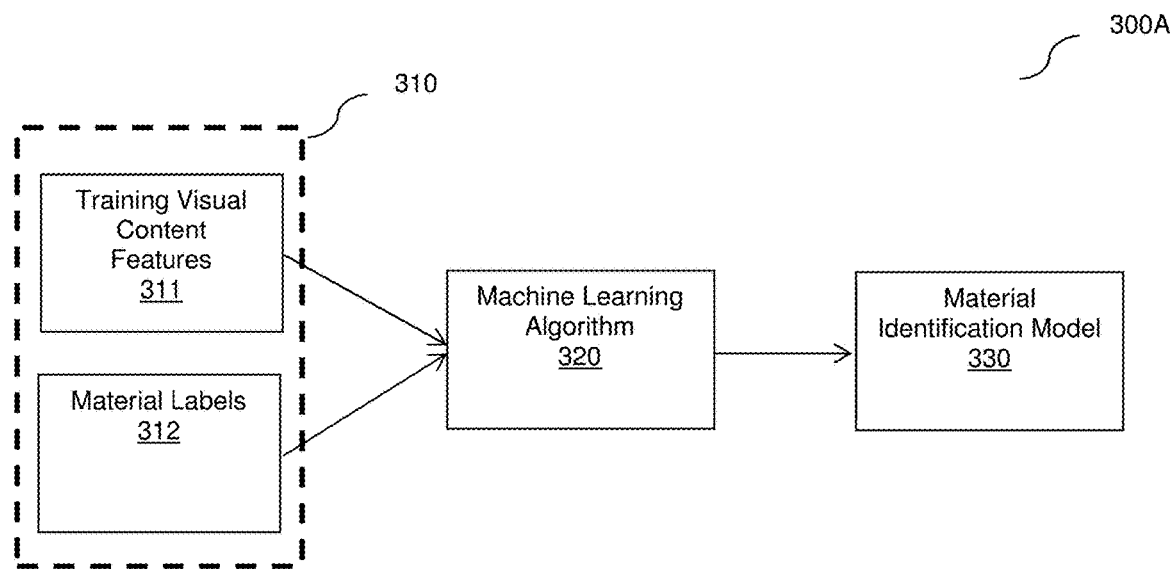
FIGS. 3A-C are flow diagrams illustrating training and application of machine learning models for identifying materials and anomalies according to an embodiment.
Figure 3B:
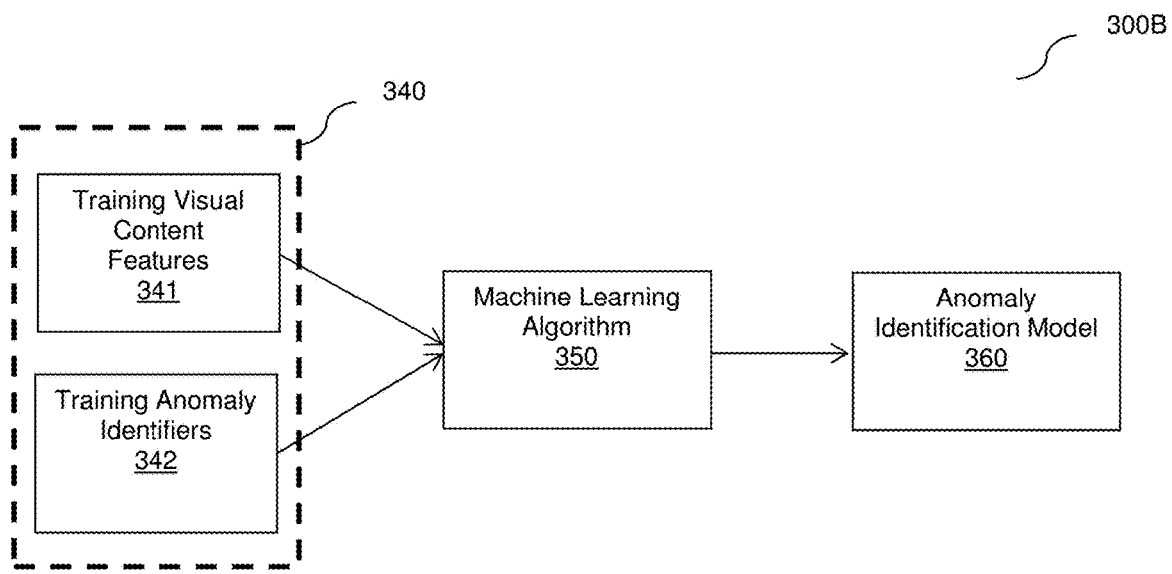

Example training phases for a material identification model and an anomaly identification model, respectively, are shown in FIGS. 3A-B.

FIG. 3A shows an example flow diagram 300A illustrating a training phase for a material identification model. In the example flow diagram 300A, training data 310 is input to a machine learning algorithm 320 in order to produce a trained material identification model 330. In an example implementation, the training data 310 includes training visual content features 311 and material labels 312. The training visual content features 311 include visual content or are extracted from visual multimedia content and may include, but is not limited to, visual multimedia content, portions thereof (e.g., individual pixels), results of image processing, combinations thereof, and the like. The material labels 312 indicate types of materials such as specific materials (e.g., steel or a specific variety of steel), general categories of materials (e.g., metal), both, and the like. In an example implementation, the material identification model 330 is a convolutional neural network trained to identify and semantically label different materials represented by visual multimedia content. The convolutional neural network may be, but not limited to, Dilated Convolutional Models, Encoder-Decoder Based Models, Multi-Scale and Pyramid Network Based Models, Fully Convolutional Networks, and Regional Convolutional Networks FIG. 3B shows an example flow diagram 300B illustrating a training phase for an anomaly identification model. In the example flow diagram 300B, training data 340 is input to a machine learning algorithm 350 in order to produce a trained anomaly identification model 360. In an example implementation, the training data 310 includes training visual content features 341 and material labels 342. The training visual content features 341 include visual content or are extracted from visual multimedia content and may include, but is not limited to, visual multimedia content, portions thereof (e.g., individual pixels), results of image processing, combinations thereof, and the like. The training visual content features 341 are of visual multimedia content that shows a specific type of material (e.g., concrete) such that the resulting anomaly identification model 360 is trained to identify anomalies in that type of material. More specifically, the anomaly identification model 360 is further trained to identify specific portions (e.g., specific pixels) representing each defect. The training anomaly identifiers 342 indicate types of anomalies (i.e., anomalies, damages, or other visual signs thereof) shown in the visual multimedia content. In an example implementation, each anomaly identification model 360 is a convolutional neural network trained to identify anomalies in infrastructure made from a particular material.

Figure 3C:
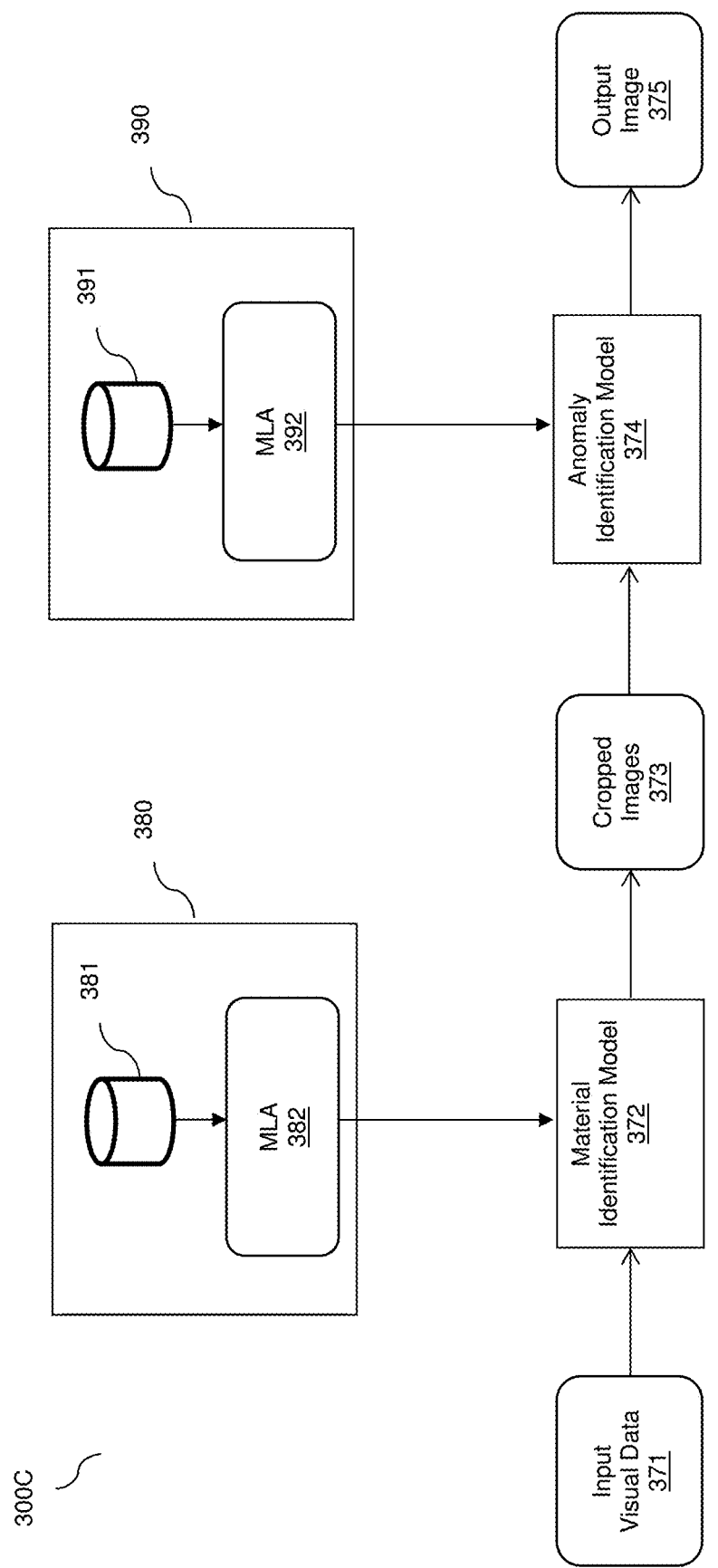

FIG. 3C is an example flow diagram 300C illustrating an application phase for applying the machine learning models trained according to FIGS. 3A-B. In FIG. 3C, input visual content 371 is input to a material identification model 372. The input visual content may include, but is not limited to, images, videos, both, and the like. The material identification model 372 is trained by applying a machine learning algorithm 382 to a training set 381, for example as described with respect to FIG. 3A. Based on the material identification, the input visual 371 may be cropped into cropped images 373. In an example implementation, the input visual content 371 is cropped such that each cropped image 373 represents a different identified material.

The cropped images 373 are each input to an anomaly identification model 374. In an embodiment, prior to inputting the cropped images 373 to the anomaly identification model 375, the cropped images 373 may be preprocessed. This preprocessing may include adding pixels having a homogenous color (e.g., all white pixels) to each cropped image in order to make the cropped image into a predetermined full image size (e.g., 6000×4000 pixels). Preprocessing cropped images to make them into a predetermined size improves accuracy of anomaly detection since differences in image sizes may cause erroneous identification, cause issues with the CNNs as in most cases they need an specific image size as an input.

The anomaly identification model 374 is trained by applying a machine learning algorithm 392 to a training set 391, for example as described with respect to FIG. 3B. The anomaly identification model 374 outputs an output image 375 that is semantically labeled with anomalies identified therein. In an embodiment, the output image 375 is created by overlaying the semantically labeled image on top of the input visual content 371.

Returning to FIG. 2, at S220, visual content for which anomalies should be identified are obtained. The visual may be retrieved, for example, from a database (e.g., one of the databases 140, FIG. 1). The images may include, but are not limited to, images, videos, and the like, showing one or more portions of infrastructure.

At optional S230, the images may be preprocessed.

In an embodiment, S230 may include, but is not limited to, removing blurry, noisy, zoomed out, or distorted images. Removing zoomed out images contributes to more accurate identification of anomalies by increasing the likelihood that each distinct portion of the image represents either an anomaly or a lack thereof (e.g., that a pixel does not show both a defected part and non-defective part of the portion of infrastructure). Additionally, removing zoomed out images reduces the likelihood that multiple materials are captured in the same image when the material identification model is only trained to identify a single type of material per image. This, in turn, results in more accurate selection of an anomaly identification model.

In another embodiment, S230 may include generating multiple 2D viewpoints based on visual multimedia content including a 3D model by projecting a desired perspective of the 3D model onto the corresponding image plane (i.e., rendering). In such an embodiment, the generated viewpoints are used as visual multimedia content for subsequent processing instead of the original 3D model. In a further embodiment, generating the multiple 2D viewpoints includes loading the 3D model in a 3D model viewer and generating multiple sets of camera positions, orientations, or combinations thereof. Multiple snapshots may be taken using the multiple sets of camera position and orientation. The camera positions and orientations may be randomly generated or may be generated according to a scheme designed to capture multiple images that are likely to result in meaningful 2D viewpoints for material and damage identification.

More specifically, the camera positions may be generated randomly by randomly selecting sets of center coordinates of the camera within the bounding box of the scene. The sets of center coordinates may include center coordinates having different altitudes. In an example implementation, the view directions are selected in a 30 to 45-degree cone oriented with respect to the ground. To ensure meaningful viewpoints, in an example implementation, at least 20% of the pixels of the viewpoints should correspond to points of the 3D model (i.e., at least 20% of each viewpoint should show part of the 3D model).

Alternatively, the camera positions may be generated according to a multiscale scheme by selecting a starting point among the points of the 3D model. A line is selected such that the line goes through the point, and multiple (e.g., 3) camera positions are generated that are on the line. Each camera position is associated with an orientation of the camera that faces toward the starting point.

At S240, the material identification model is applied to the visual multimedia content or features extracted therefrom in order to identify a type of material of the portion of infrastructure shown in the visual multimedia content.

At S250, based on the identified type of material, one of the anomaly identification models is selected. The selected anomaly identification model is trained to identify anomalies in the identified type of material.

In some implementations (not shown), different anomaly identification models may be selected for different portions of the visual multimedia content. This may occur, for example, when different images or viewpoints prominently feature different portions of infrastructure made of different materials. In such an implementation, each selected anomaly identification model may be applied to its respective image or viewpoint.

In a further embodiment, S250 may include cropping or otherwise separating the different portions of the visual multimedia content based on the material identifications and selecting an anomaly identification model for each portion. Each separated portion therefore represents a part of the infrastructure made of a different material.

At S260, the selected anomaly identification model is applied to the visual multimedia content or features extracted therefrom to determine which portions of the visual multimedia content indicate anomalies. More specifically, S260 includes determining which distinct portions (e.g., pixels, areas of parametric surfaces, points of point clouds, triangles of surface meshes, etc.) of the visual multimedia content represent each identified defect. In an example implementation, S260 includes determining, for each pixel in an image, whether and which anomaly is represented by that pixel. In another example implementation, S260 includes determining, for each point in a 3D model, whether and which anomaly is represented by that point.

At S270, the visual multimedia content is semantically segmented. The semantically segmented visual multimedia content includes labeled distinct portions (e.g., pixels, 3D model points, etc.), where each label indicates the anomaly (or lack thereof) determined for its respective distinct portion.

At optional S280, one or more patterns representing the identified anomalies are extracted from the semantically segmented visual multimedia content. An example of a pattern representing an anomaly identified in semantically segmented visual multimedia content is shown in FIG. 10C, discussed below. In an embodiment, the extracted patterns are utilized to semantically label a 3D model representing the portion of infrastructure as described below with respect to FIG. 8.

At optional S290, a report may be generated. The report may include, but is not limited to, a quantification of each anomaly shown in the visual multimedia content, modified visual multimedia content that visually distinguish anomalies from areas of the infrastructure portion that are not anomalous, a three-dimensional virtual model that visually distinguishes anomalies from areas of the infrastructure portion that are not anomalous, or a combination thereof. To this end, S290 further includes determining a value of such quantification or creating images or three-dimensional virtual model based on the semantically segmented visual multimedia content. Creation of 3D models using semantically labeled visual multimedia content is described further with respect to FIG. 8.

The quantification may be, for example, a relative size of the anomaly shown in a portion of visual multimedia content (e.g., a portion of an image, viewpoint, or 3D model representing the defect) compared to the size of the entire portion of visual multimedia content (e.g., based on number of pixels representing the anomaly as compared to total number of pixels in the image, based on a number of points representing the anomaly as compared to total number of points in the 3D model, based on a size of the mesh of the anomaly as compared to the size of the entire 3D model, etc.). The quantification may be, but is not limited to, a relative area, volume, height, width, or other measurement of the defect. As a non-limiting example, the quantification may indicate a relative width of a crack in a column.

Alternatively, in an embodiment, the quantification may be an absolute size of the anomaly. As a non-limiting example, the quantification may be a thickness of a crack in millimeters. In such an embodiment, the quantification is determined based on a known scale of the semantically labeled 3D model and the relative size of the anomalous portion as compared to the entire semantically labeled 3D model. The known scale may indicate, for example, a size of each point. In some implementations, the known scale may be further derived based on a known size of the civil infrastructure.

The modified visual multimedia content is modified with respect to the portions representing anomalies such that those portions are visually distinct from other portions (i.e., portions that do not represent anomalies). In an example implementation, the modification may include changing the color of the distinct portions representing anomalies using colors that are not distinct from colors of the material shown in the visual multimedia content (e.g., green, red, or blue color may be used to visually distinguish cracks in grey concrete). The visual multimedia content may be further modified such that pixels representing different anomalies are also visually distinct from each other.

In an embodiment, S290 further comprises identifying a condition state of each anomaly based on the quantification of the anomaly and one or more condition state rules. The condition state may indicate a severity of the anomaly, i.e., a measure of how abnormal the anomaly is. The condition state rules may be predetermined, and may be based on condition state descriptions provided by regulatory authorities such as, but not limited to, the American Associated of State Highway and Transportation Officials (AASHTO), the American Society for Testing and Material (ASTM), and the like. Non-limiting example condition states include good, fair, poor, and severe.

The condition state rules define condition states and corresponding quantifications for different types of anomalies, materials, or both. As a non-limiting example, for cracks (anomaly) in reinforced concrete (material), crack width of less than 0.012 inches may have a condition state of good, crack width between 0.012 and 0.05 inches may have a condition state of fair, and crack width greater than 0.05 inches may have a condition state of poor. Alternatively or collectively to defining condition state rules with respect to thresholds of absolute quantification values, the thresholds for different condition states may be defined with respect to percentages rather than absolute values.

In this regard, it is noted that some condition state definitions provided by regulatory authorities include descriptions such as "moderate" and "heavy" as thresholds for different levels of severity. However, these descriptions are highly subjective. Because the disclosed embodiments provide quantifications that represent objective sizes of anomalies relative to the larger infrastructure, the disclosed embodiments may be utilized to implement these subjective descriptions in a manner that renders decisions of severity objective.

Figure 5A:
FIGS. 5A-B are example images utilized to describe modifying an image to visually distinguish anomalies from other parts of the image.
Figure 5B:

FIGS. 5A and 5B show example images 500A and 500B, respectively, of a portion of a bridge. Specifically, FIGS. 5A and 5B show a bridge abutment. The image 500A is an original image showing anomalies 510-1 and 510-2. In the example image 500A, the anomalies 510-1 and 510-2 are damage to the bridge abutment. More specifically, the damage shown in example FIGS. 5A and 5B is spalling and exposed rebar. The image 500A is analyzed as described with respect to Steps S220 through S260, and a modified image 500B is created. The image 500B shows the anomalies as modified anomalies 520-1 and 520-2 that have been modified to be visually distinct from the rest of the image 500B.

When a model is generated, the three-dimensional virtual model may also include, but not limited to, distinct portions (e.g., areas of parametric surfaces, triangles of surface meshes, points of point clouds, etc.) representing anomalies that are visually distinct from non-defective portions. In some implementations, S290 may further include creating the three-dimensional virtual model, for example based on the images obtained at S220. In an example implementation, the three-dimensional virtual model may be a colored model using the RGB color model. Creation of the three-dimensional virtual model allows for visually demonstrating the identified anomalies in the context of the infrastructure shown in the visual content that, in turn, improves user interactions with the anomaly identification data.

Figure 6A:
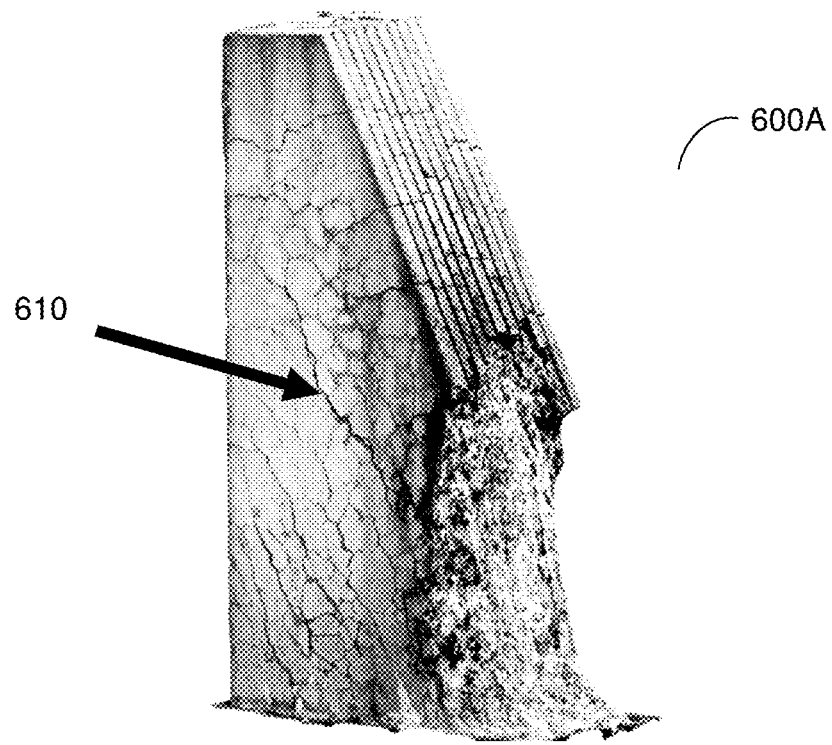
FIGS. 6A-B are example three-dimensional virtual models utilized to describe modifying a three-dimensional virtual model to visually distinguish anomalies from other parts of the model.
Figure 6B:
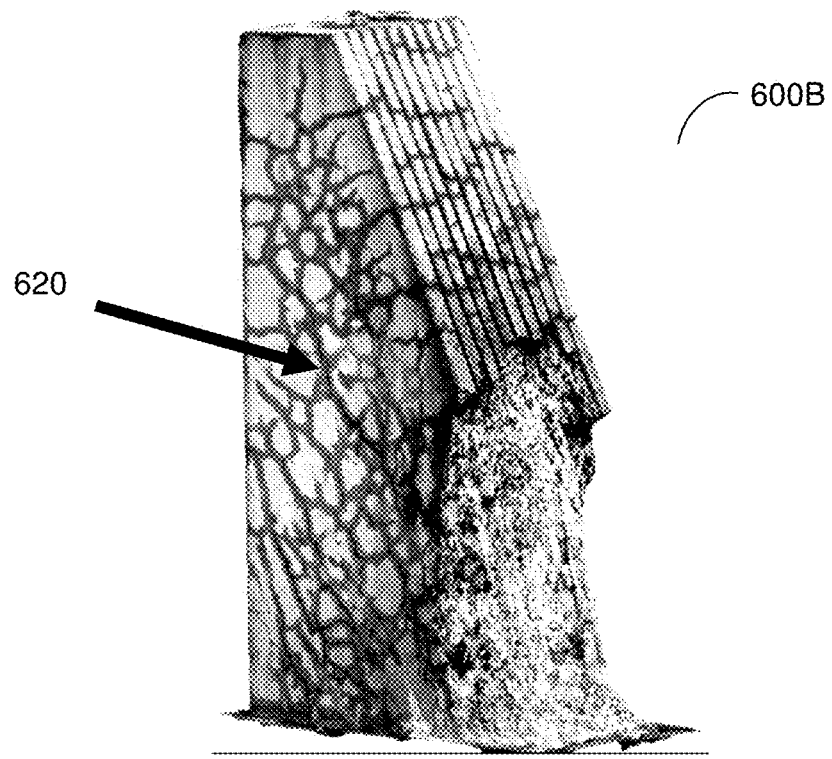

FIGS. 6A and 6B show example three-dimensional (3D) three-dimensional virtual models 600A and 600B. The 3D model 600A shows a column featuring anomalies 610. In the example 3D model 600A, the anomalies 610 are cracks in the column. Images of the column are analyzed as described with respect to Steps S220 through S260, and a modified 3D model 600B is created. The 3D model 600B shows the cracks 610 that have been modified to visually distinguish the cracks from the other portions of the model.

Figure 7A:
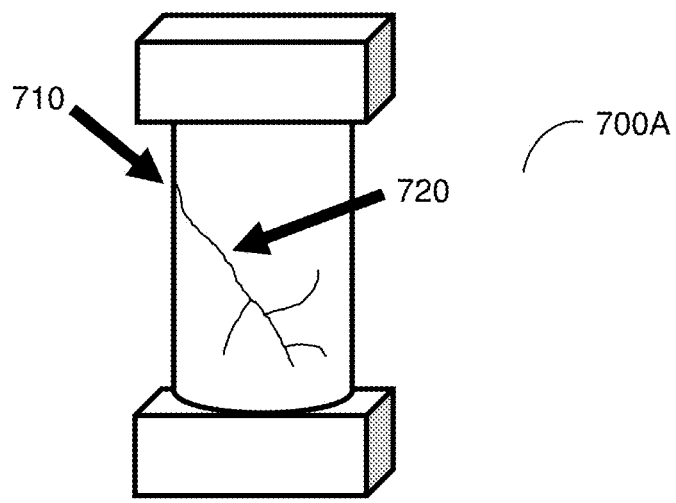
FIGS. 7A-C are example illustrations of three-dimensional virtual models utilized to describe modifying a three-dimensional virtual model to visually distinguish anomalies from other parts of the model.
Figure 7B:
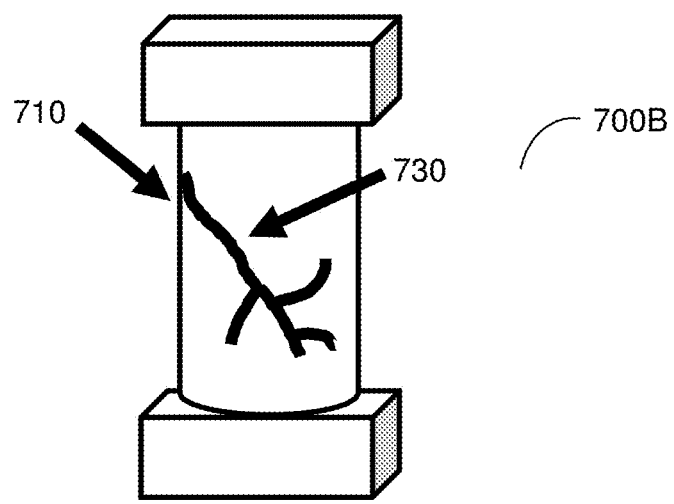
Figure 7C:
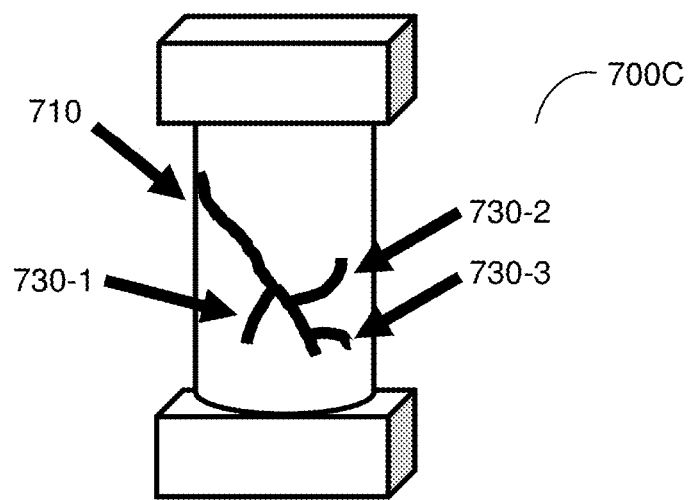

FIGS. 7A-C show example illustrations of 3D virtual models 700A, 700B, and 700C, respectively. The 3D model 700A shows a column 710 featuring anomalies 720. Images of the column 710 are analyzed as described with respect to Steps S220 through S260, and a modified 3D model 700B is created.

The modified 3D model 700B shows visually distinct sections 730 around the location of the cracks 720 shown in FIG. 7A. In an example implementation (not reflected in the black-and-white drawings of FIG. 7B), the visually distinct sections 730 may be colored, for example using pink or blue coloring.

The modified 3D model 700C shows visually distinct subsections 730-1 through 730-3. Each of the subsections 730-1 is a visually distinguished section of the cracks 720. The subsections 730-1 through 730-3 may be of different granularities. As a non-limiting example, such granularities may be expressed as thickness of a crack in millimeters.

In this regard, it is noted that abnormalities such as cracks and other defects may vary in granularity (e.g., width, radius, thickness, etc.) in different portions. These variations are highly relevant to assessing the state of civil infrastructure. For example, a crack may vary in thickness along its length, and portions of the crack having higher thickness may be priorities when performing maintenance. Thus, further visually distinguishing varying granularity portions from each other allows for effectively visually representing the state of the civil infrastructure.

To this end, in an embodiment, portions of the abnormality (e.g., each portion being represented by one or more points on a 3D model showing the anomaly) may be colored according to the granularity of that portion. Accordingly, the variations in color may effectively act as a heat map visually identifying different granularities. Different granularities may be identified as, for example, different quantifications determined as described herein.

As a non-limiting example, in FIG. 3C, the subsections 730-1 through 730-3 have thicknesses of 4 millimeters, 3 millimeters, and 2 millimeters, respectively. Thus, in a further example, the subsection 730-1 may be colored red, the subsection 730-2 may be colored orange, and the subsection 730-3 may be colored yellow. When a visual display is generated based on a 3D model colored in this way, the differences in thickness are readily visible to a user.

It should be noted that, although FIG. 7C is depicted as having three branches of the crack 720 having 3 distinct thicknesses, such depiction is merely an example and does not limit the disclosed embodiments. The disclosed embodiments are equally applicable to further variations. As a non-limiting example, each of the subsections 730-1 through 730-3 may include different colored pixels to show variations in thickness along their lengths. Additionally, the example colors described above are not limiting, and different colors may be used to visually distinguish portions accordingly.

Returning to FIG. 2, it should be noted that FIG. 2 is discussed with respect to identifying a single material shown in visual multimedia content merely for simplicity purposes, and that multiple materials may be identified according to the disclosed embodiments. In some implementations, a machine learning model may be trained to identify multiple materials (if applicable) and to identify portions of the visual multimedia content showing each material. Such implementations would allow for further granularity and, therefore, accuracy, of the anomaly identification.

It should also be noted that various embodiments of FIG. 2 are described with respect to pixels for 2D images or viewpoints of elements for 3D models (e.g., areas of parametric surfaces, points of point clouds, triangles of surface meshes, etc.), but that other distinct portions of visual multimedia content may be equally used without departing from the disclosed embodiments. Further, some embodiments of FIG. 2 are described with respect to identifying anomalies in images, but anomalies may be identified in other visual multimedia content (e.g., video or video frames). Additionally, the visual multimedia content may be two-dimensional or three-dimensional. Machine learning models may be trained differently for different types of multimedia content (e.g., for 2D images and 3D images).

It should also be noted that FIG. 2 is described with respect to applying a single anomaly identification model merely for simplicity and that multiple anomaly identification models may be applied (for example, when multiple materials are detected). To this end, in some implementations, the method of FIG. 2 may further include cropping or otherwise isolating portions of the visual content representing different materials and applying a different anomaly identification model to each portion.

Figure 8:
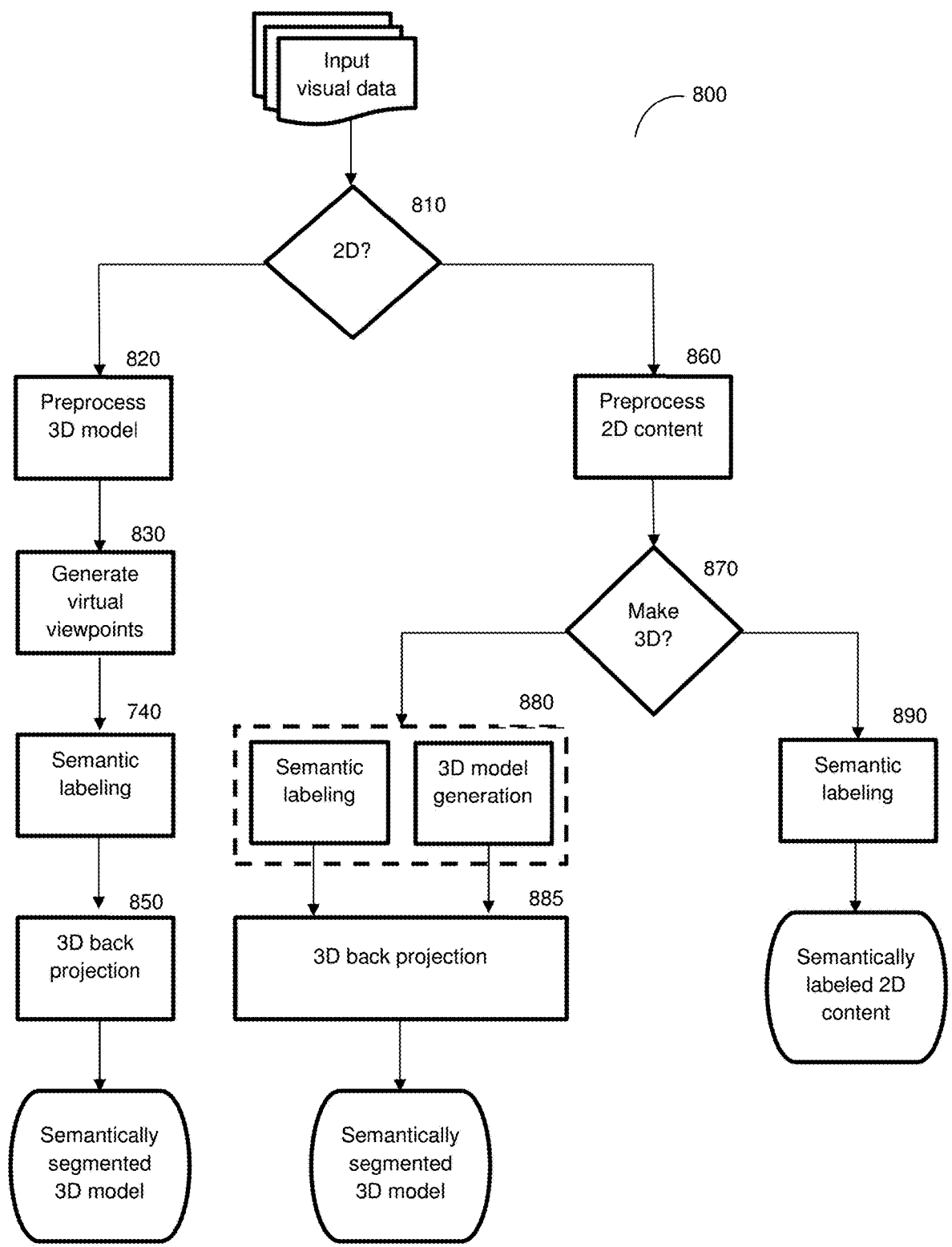
FIG. 8 is a flow diagram illustrating creation of a semantically labeled three-dimensional model in accordance with an embodiment.

In some embodiments, the semantic labeling may be performed as part of a process that takes into account the type of visual multimedia content being input. An example flow diagram 800 showing such a process is shown in FIG. 8.

At 810, it is determined whether input visual multimedia content includes 2D content (e.g., 2D images, 2D video, or both). If so, execution continues with 860; otherwise, execution continues with 820.

At 820, when the visual multimedia content is not 2D images or video (i.e., that the visual multimedia content is a 3D model), the 3D model is preprocessed. At 830, virtual viewpoint generation may be performed to create multiple virtual viewpoints of the 3D model as described herein. At 840, anomalies shown in the virtual viewpoints are identified and semantically labeled. In an embodiment, the semantic labeling is performed as described with respect to FIG. 2. At 850, 3D back projection is performed to create a semantically labeled 3D model.

At 860, when the visual multimedia content includes 2D images or video, the images or video frames of the video are preprocessed.

At 870, it is determined if the visual multimedia content is to be utilized for 3D model reconstruction. If so, execution continues with 880; otherwise, execution continues with 890.

At 880, semantic labeling of anomalies as well as 3D model generation are performed.

The semantic labeling may be performed as described with respect to FIG. 2. The resulting labeled images and camera poses are utilized at 885 to perform 3D back projection in order to create a semantically labeled 3D model representing the 2D visual multimedia content. The 3D model generation is utilized to reconstruct a 3D model of the structure and may include use of methods such as, but not limited to, structure from motion, multi-view stereo, image-based modeling, interactive multi-view modeling, automatic multi-view modeling, combinations thereof, and the like.

At 890, semantic labelling of anomalies is performed with respect to the 2D images or videos, for example as described with respect to FIG. 2.

Figure 9A:
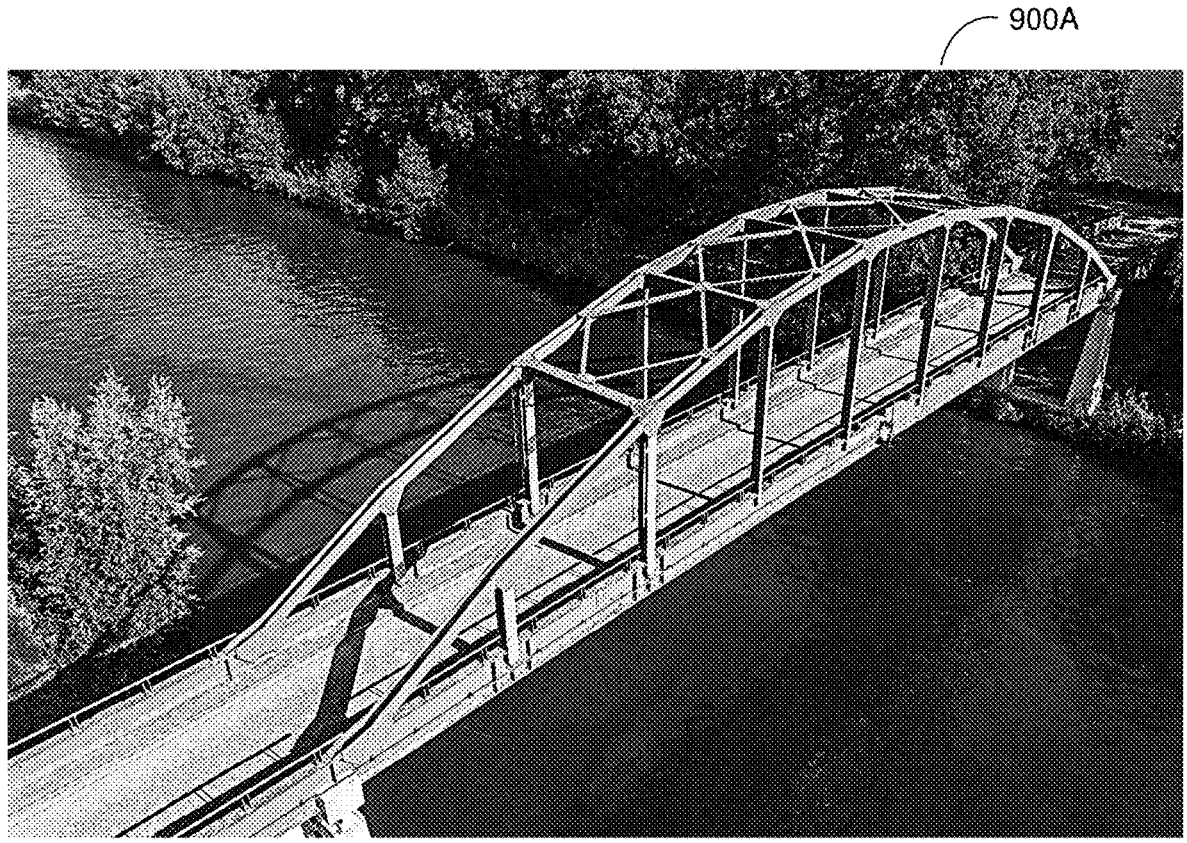
FIGS. 9A-C are example images utilized to demonstrate a three-dimensional model created based on visual content showing civil infrastructure according to an embodiment.
Figure 9B:
Figure 9C:
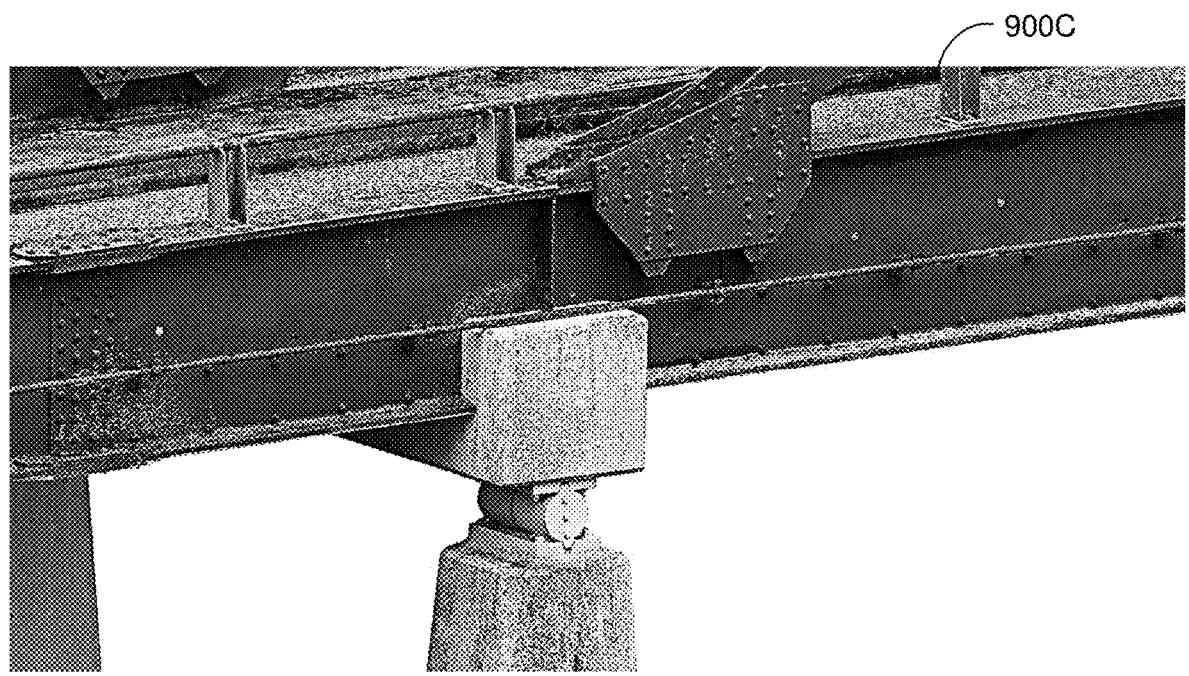

FIGS. 9A-C are example images utilized to demonstrate a 3D model created based on visual content in accordance with the disclosed embodiments. FIG. 9A shows an image 900A of a bridge captured by a drone deployed near the bridge. Various such images are captured and utilized as described herein. The result is a 3D model, which is visually depicted in the renderings 900B and 900C. The rendering 900C further shows a closer view at a bearing on the bridge. In various implementations, portions of the bridge may include distinct coloring or other visually distinguishing features added to anomalies identified in the infrastructure as described herein.

Figure 10A:
FIGS. 10A-B are example images of three-dimensional virtual models utilized to describe modifying a three-dimensional virtual model to visually distinguish anomalies from other parts of the model.
Figure 10B:
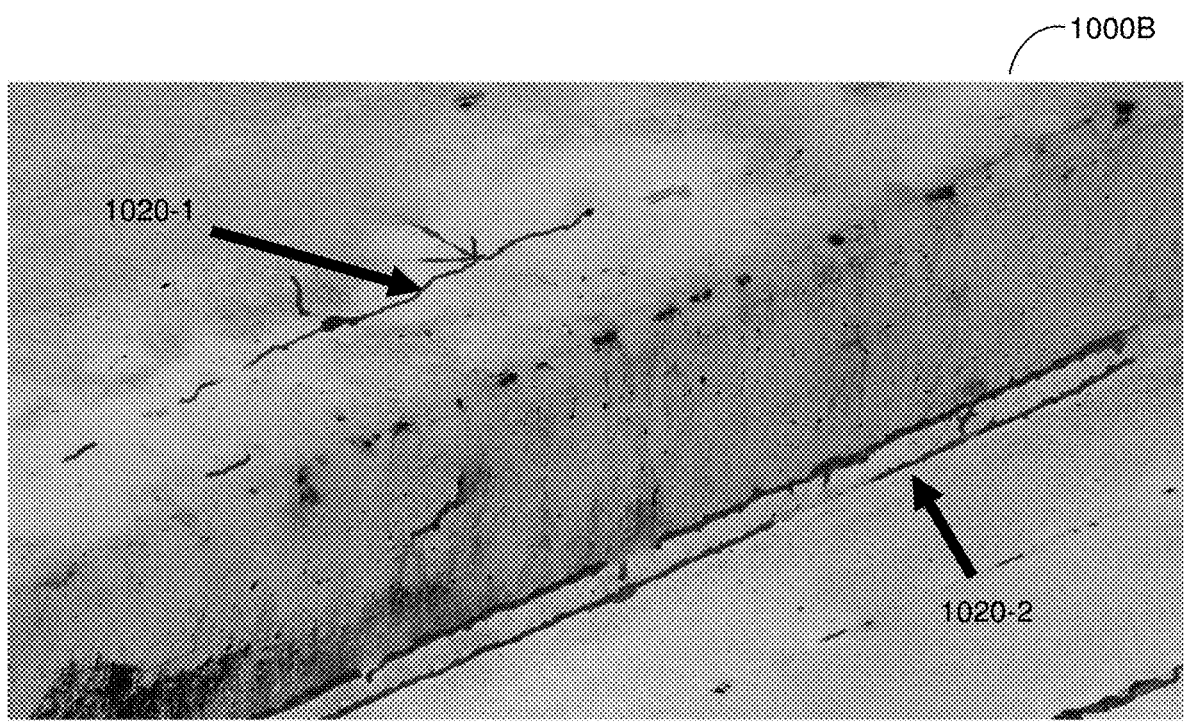

FIGS. 10A-10C show other views 1000A and 1000B of the 3D model shown in FIGS. 9B-C utilized to demonstrate application of visually distinct markers to the 3D model. As seen in FIG. 10A, cracks and markings 1010-1 and 1010-2 have developed in the bridge. These cracks and markings 1010-1 and 1010-2 are marked using thickened colored markers 1020-1 and 1020-2 that reflect the general shape of the cracks and markings 1010-1 and 1010-2 while highlighting the distinguishing features.

Figure 4:
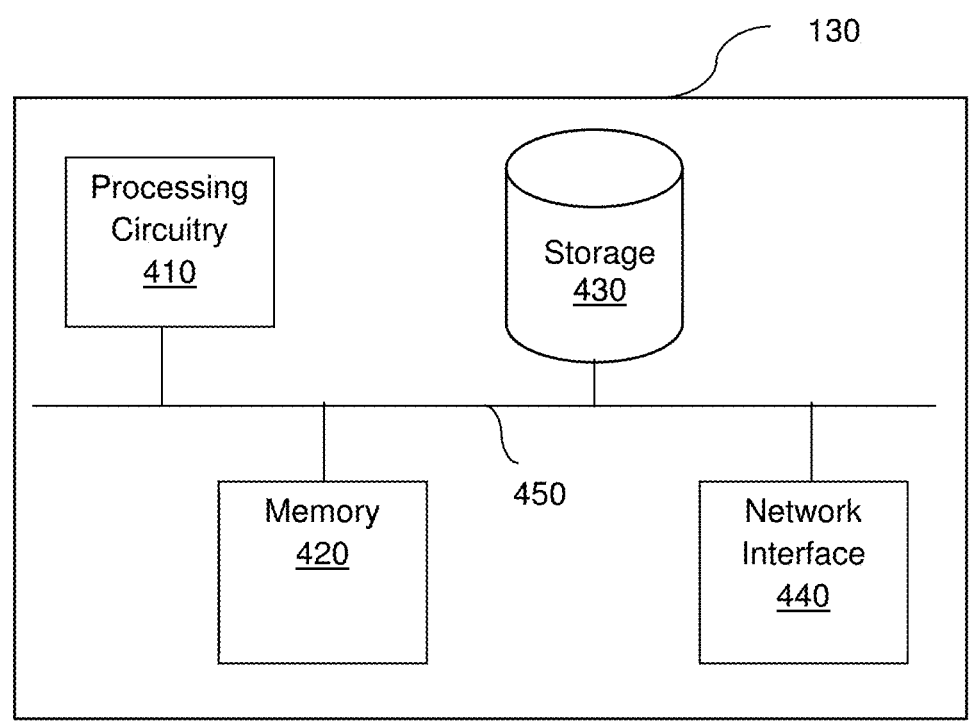
FIG. 4 is a schematic diagram of an anomaly identifier according to an embodiment.

FIG. 4 is an example schematic diagram of an anomaly identifier 130 according to an embodiment. The anomaly identifier 130 includes a processing circuitry 410 coupled to a memory 420, a storage 430, and a network interface 440. In an embodiment, the components of the anomaly identifier 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the anomaly identifier 130 to communicate with the databases 140 for the purpose of, for example, retrieving visual multimedia content showing portions of infrastructure. Further, the network interface 440 allows the anomaly identifier 130 to communicate with the user device 120 for the purpose of sending visual multimedia content, models, or both, for display.

It should be understood that the embodiments described herein are not limited to the specific architecture illustrated in FIG. 4, and other architectures may be equally used without departing from the scope of the disclosed embodiments.

It should be noted that various embodiments described herein mention applying machine learning models to visual multimedia content merely for simplicity purposes and that such application does not require directly applying the machine learning models to visual multimedia content such as images. In particular, features may be extracted from the visual multimedia content and the machine learning models may be applied to any or all of the extracted features according to the disclosed embodiments.

Additionally, various disclosed embodiments are discussed with respect to example infrastructure or portions thereof such as roads, bridges, buildings, dams, pipes, tracks, tunnels, poles, power lines, portions thereof, and the like, but that any infrastructure that can be visually represented may be analyzed for anomalies in accordance with the disclosed embodiments. The disclosed embodiments are not limited to particular example portions of infrastructure described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. More specifically, the machine may include a graphics processing unit (GPU). The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for context-aware identification of anomalies in civil infrastructure, comprising:
   applying a material identification model to features extracted from visual multimedia content showing at least a portion of civil infrastructure in order to determine a type of material shown in a portion of the visual multimedia content, wherein the material identification model is a machine learning model trained to identify types of materials based on visual multimedia content showing infrastructure;

applying an anomaly identification model to the features extracted from the visual multimedia content in order to determine at least one anomalous portion shown in the visual multimedia content, a type of each anomalous portion, and a quantification of each anomalous portion; wherein the anomaly identification model is a machine learning model selected from among a plurality of anomaly identification models based on the determined type of material;

extracting at least one pattern of the at least one anomalous portion from the visual multimedia content, wherein each of the at least one extracted pattern is collectively defined by a portion of a plurality of anomalous points; and generating a semantically labeled three-dimensional (3D) model based on the at least one anomalous portion and the type of each anomalous portion, wherein the semantically labeled 3D model includes a plurality of points; the plurality of points including the plurality of anomalous points; wherein each anomalous point represents a respective anomalous portion of the at least one anomalous portion; wherein each anomalous point is visually distinguished to at least indicate the quantification of the respective anomalous portion; wherein generating the semantically labeled 3D model further comprises projecting the extracted at least one pattern.

2. The method of claim 1, further comprising:
semantically labeling the visual multimedia content based on the at least one anomalous portion and the type of each anomalous potion; wherein the semantically labeled 3D model is generated based further on the semantically labeled visual multimedia content.

3. The method of claim 1, wherein generating the semantically labeled 3D model further comprises:
generating a 3D model of the civil infrastructure based on the visual multimedia content;
creating a map of corresponding features between the visual multimedia content and the 3D model of the civil infrastructure; and
semantically labeling the 3D model based on the semantically labeled visual multimedia content and the map of corresponding features.

4. The method of claim 1, wherein semantically labeling the visual multimedia content further comprises:
applying a visually distinct marker to each anomalous point, wherein each visually distinct marker is a visually distinct color that is different from an original color of the anomalous point.

5. The method of claim 1, wherein generating the semantically labeled 3D model includes modifying points of a 3D model representing the civil infrastructure.

6. The method of claim 1, further comprising:
generating a report based on the semantically labeled visual multimedia content, wherein the report indicates a quantification of the at least one anomalous portion.

7. The method of claim 1, wherein the quantification of each of the at least one anomalous portion is an absolute size of the anomalous portion determined based on a known scale of the 3D model.

8. The method of claim 1, wherein the quantification of each of the at least one anomalous portion is a relative size of the at least one anomalous portion as compared to the 3D model.

9. The method of claim 1, wherein the plurality of points of the 3D model are points constituting any of: a plurality of parametric surface areas, a plurality of mesh triangles, and a point cloud.

10. The method of claim 1, further comprising:
determining a condition state of the civil infrastructure based on the quantification of each of the at least one anomalous portion and at least one condition state policy, wherein each condition state policy defines a plurality of quantifications of different types of anomalies and a plurality of corresponding condition states.

11. The method of claim 1, wherein generating the semantically labeled 3D model further comprises:
identifying corresponding features between the visual multimedia content and a 3D model of the infrastructure; and
mapping the at least one anomalous portion onto the 3D model of the infrastructure.

12. The method of claim 11, wherein generating the semantically labeled 3D model further comprises:
modifying at least one portion of the 3D model mapped to the at least one anomalous portion.

13. A non-transitory computer readable medium having stored thereon instructions for causing a processing circuitry to execute a process, the process comprising:
applying a material identification model to features extracted from visual multimedia content showing at least a portion of civil infrastructure in order to determine a type of material shown in a portion of the visual multimedia content, wherein the material identification model is a machine learning model trained to identify types of materials based on visual multimedia content showing infrastructure;
applying an anomaly identification model to the features extracted from the visual multimedia content in order to determine at least one anomalous portion shown in the visual multimedia content, a type of each anomalous portion, and a quantification of each anomalous portion; wherein the anomaly identification model is a machine learning model selected from among a plurality of anomaly identification models based on the determined type of material;
extracting at least one pattern of the at least one anomalous portion from the visual multimedia content, wherein each of the at least one extracted pattern is collectively defined by a portion of a plurality of anomalous points; and
generating a semantically labeled three-dimensional (3D) model based on the at least one anomalous portion and the type of each anomalous portion, wherein the semantically labeled 3D model includes a plurality of points; the plurality of points including the plurality of anomalous points; wherein each anomalous point represents a respective anomalous portion of the at least one anomalous portion; wherein each anomalous point is visually distinguished to at least indicate the quantification of the respective anomalous portion; wherein generating the semantically labeled 3D model further comprises projecting the extracted at least one pattern.

14. A system for context-aware identification of anomalies in civil infrastructure, comprising:
a processing circuitry; and a memory, the memory containing instructions that, when executed by the processing circuitry, configure the system to:

apply a material identification model to features extracted from visual multimedia content showing at least a portion of civil infrastructure in order to determine a type of material shown in a portion of the visual multimedia content, wherein the material identification model is a machine learning model trained to identify types of materials based on visual multimedia content showing infrastructure;

apply an anomaly identification model to the features extracted from the visual multimedia content in order to determine at least one anomalous portion shown in the visual multimedia content, a type of each anomalous portion, and a quantification of each anomalous portion; wherein the anomaly identification model is a machine learning model selected from among a plurality of anomaly identification models based on the determined type of material; and extract at least one pattern of the at least one anomalous portion from the visual multimedia content, wherein each of the at least one extracted pattern is collectively defined by a portion of a plurality of anomalous points; and generate a semantically labeled three-dimensional (3D) model based on the at least one anomalous portion and the type of each anomalous portion, wherein the semantically labeled 3D model includes a plurality of points; the plurality of points including the plurality of anomalous points; wherein each anomalous point represents a respective anomalous portion of the at least one anomalous portion; wherein each anomalous point is visually distinguished to at least indicate the quantification of the respective anomalous portion; wherein generating the semantically labeled 3D model further includes projecting the extracted at least one pattern.

15. The system of claim 14, wherein the system is further configured to: semantically label the visual multimedia content based on the at least one anomalous portion and the type of each anomalous potion; wherein the semantically labeled 3D model is generated based further on the semantically labeled visual multimedia content.

16. The system of claim 14, wherein the system is further configured to:
generate a 3D model of the civil infrastructure based on the visual multimedia content;
create a map of corresponding features between the visual multimedia content and the 3D model of the civil infrastructure; and
semantically label the 3D model based on the semantically labeled visual multimedia content and the map of corresponding features.

17. The system of claim 14, wherein the system is further configured to:
apply a visually distinct marker to each anomalous point, wherein each visually distinct marker is a visually distinct color that is different from an original color of the anomalous point.

18. The system of claim 14, wherein generating the semantically labeled 3D model includes modifying points of a 3D model representing the civil infrastructure.

19. The system of claim 14, wherein the system is further configured to:
generate a report based on the semantically labeled visual multimedia content, wherein the report indicates a quantification of the at least one anomalous portion.

20. The system of claim 14, wherein the quantification of each of the at least one anomalous portion is an absolute size of the anomalous portion determined based on a known scale of the 3D model.

21. The system of claim 14, wherein the quantification of each of the at least one anomalous portion is a relative size of the at least one anomalous portion as compared to the 3D model.

22. The system of claim 14, wherein the plurality of points of the 3D model are points constituting any of: a plurality of parametric surface areas, a plurality of mesh triangles, and a point cloud.

23. The system of claim 14, wherein the system is further configured to:
determine a condition state of the civil infrastructure based on the quantification of each of the at least one anomalous portion and at least one condition state policy, wherein each condition state policy defines a plurality of quantifications of different types of anomalies and a plurality of corresponding condition states.

* * * * *